(12) United States Patent
Radjassamy (10) Patent No.: US 6,928,574 B1
(45) Date of Patent: Aug. 9, 2005

(54) SYSTEM AND METHOD FOR TRANSFERRING DATA FROM A LOWER FREQUENCY CLOCK DOMAIN TO A HIGHER FREQUENCY CLOCK DOMAIN

(75) Inventor: Rajakrishnan Radjassamy, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 754 days.

(21) Appl. No.: 09/938,210

(22) Filed: Aug. 23, 2001

(51) Int. Cl.$^7$ ............................................. G06F 1/06
(52) U.S. Cl. ...................... 713/501; 713/500; 713/503; 375/354; 375/355
(58) Field of Search .............................. 713/500, 501, 713/503, 600; 710/52, 58; 375/354, 355

(56) References Cited

U.S. PATENT DOCUMENTS

| | | | | |
|---|---|---|---|---|
| 5,369,672 A | * | 11/1994 | Matsumoto | ................ 375/354 |
| 5,548,620 A | * | 8/1996 | Rogers | ...................... 375/354 |
| 5,600,824 A | | 2/1997 | Williams et al. | ............ 395/551 |
| 5,708,801 A | | 1/1998 | Williams et al. | ............ 395/551 |
| 5,905,766 A | * | 5/1999 | Nguyen | ...................... 375/354 |
| 5,930,311 A | * | 7/1999 | Lovelace et al. | ........... 375/354 |
| 6,163,545 A | * | 12/2000 | Flood et al. | ................. 370/465 |
| 6,345,328 B1 | * | 2/2002 | Rozario et al. | ............... 710/52 |

* cited by examiner

*Primary Examiner*—Lynne H. Browne
*Assistant Examiner*—Paul Yanchus, III (57) ABSTRACT

A system and method for transferring data from circuitry disposed in a lower frequency clock domain actuated by a first clock signal to circuitry disposed in a higher frequency clock domain actuated by a second clock signal, wherein the first and second clock signals are provided in a predetermined frequency ratio. A latch gated by the first clock signal is operable to generate latched data, which is provided to a first register disposed in the higher frequency clock domain. The first register, clocked by a modified clock signal that is synthesized by a logic circuit using the second clock signal and a plurality of intermediary clock signals derived from the second clock signal, is operable to generate registered data. A second register is operable to synchronize the registered data into a data output for subsequent use by the circuitry disposed in the higher clock frequency domain.

32 Claims, 5 Drawing Sheets

SYSTEM AND METHOD FOR TRANSFERRING DATA FROM A LOWER FREQUENCY CLOCK DOMAIN TO A HIGHER FREQUENCY CLOCK DOMAIN

CROSS-REFERENCE TO RELATED APPLICATION(S)

This application discloses subject matter related to the subject matter disclosed in the following commonly owned co-pending patent application(s): (i) "System And Method For Synchronizing Data Transfer Across A Clock Domain Boundary," filed Jun. 22, 2001, application Ser. No. 09/887,793, in the name(s) of: Richard W. Adkisson; (ii) "SYNC Pulse Compensation And Generation In A Clock Synchronizer Controller," filed Jun. 22, 2001, application Ser. No. 09/887,797, in the name(s) of: Richard W. Adkisson; and (iii) "System And Method For Transferring Data From A Higher Frequency Clock Domain To A Lower Frequency Clock Domain," filed even date herewith, application Ser. No.: 09/938,206, in the name(s) of: Rajakrishnan Radjassamy.

BACKGROUND OF THE INVENTION

1. Technical Field of the Invention

The present invention generally relates to data transfer synchronization techniques. More particularly, and not by way of any limitation, the present invention is directed to a skew-tolerant system and method for transferring data from circuitry disposed in a lower frequency clock domain to circuitry disposed in a higher frequency clock domain.

2. Description of Related Art

Computer systems often need to communicate with different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the circuitry disposed thereon) may be clocked using timing signals derived from the master clock wherein the derived frequencies ($F_D$) follow the relationship: $F_C/F_D > 1$.

Because of the use of different—although related—frequencies for operating the constituent digital circuit portions, synchronizer circuitry is often used in computer systems to synchronize data transfer operations across a clock domain boundary so as to avoid timing-related data errors. Such synchronizer circuitry is typically required to possess low latency, so that the data is transferred as quickly as possible without significant delay. In addition, since the conventional arrangements to produce clocks of different yet related frequencies (e.g., phase-locked loops (PLLs) and the like) can have a large amount of input/output (I/O) jitter, it is an essential requirement that the synchronizer circuitry be able to tolerate significant amounts of phase difference (or, skew) between the clocks caused thereby.

Several synchronizer designs are currently available that attempt to synchronize data transfer operations across a clock boundary. A significant drawback of these solutions, however, is that their performance with respect to clock skew is not entirely satisfactory, especially where faster clock signals are employed.

SUMMARY OF THE INVENTION

Accordingly, the present invention advantageously provides a high skew-tolerant synchronizer system and method for transferring data across a clock domain boundary in a digital electrical system such as, e.g., a computer system. Specifically, the system and method of the present invention is operable to transfer data from circuitry disposed in a lower frequency clock domain actuated by a first clock signal (e.g., a bus clock signal) to circuitry disposed in a higher frequency clock domain actuated by a second clock signal (e.g., a core clock signal).

In a presently preferred exemplary embodiment of the present invention, the first and second clock signals are provided in a predetermined frequency ratio, e.g., [M:N]; N equals the number of cycles of the second clock signal and M equals the number of cycles of the first clock signal and further equals (N−1), wherein the cycles of the first and second clock signals are numbered between two consecutive substantially coincident rising edges of the first and second clock signals, which coincident rising edges define a coincident edge (CE) interval for purposes of the present invention.

A latch gated by the first clock signal is operable to hold the data provided by the circuitry in the lower frequency clock domain in order to generate latched data. A first register disposed in the higher clock frequency domain is operable to receive the latched data, wherein the first register is clocked by a modified clock signal that is synthesized by a logic circuit using the second clock signal and a plurality of intermediary clock signals derived from the second clock signal. The first register is operable to generate registered data based on the latched data received from the latch. A second register is operable to synchronize the registered data into a data output for subsequent use by the circuitry disposed in the higher clock frequency domain, such that the circuitry will ignore the data registered by the clock edge before the coinciding rising edge.

Preferably, four intermediary clock signals, CHOP_CORE1 through CHOP_CORE4, in addition to the second clock signal are utilized by the logic circuit for generating the modified clock (MOD_CORE) signal, where each intermediary clock signal is derived in a particular relationship with the second clock signal. In the presently preferred exemplary embodiment of the present invention, the CHOP_CORE1 signal is generated such that its rising edge is triggered by a logic circuit with a propagation delay of about 400 picoseconds from an (N−1)th rising edge of the second clock signal in a particular CE interval and its falling edge is triggered preferably by the same logic circuit from an (N−M)th rising edge of the second clock signal in a CE interval immediately following the particular CE interval.

The CHOP_CORE2 clock signal is generated such that its rising edge is triggered by a logic circuit with a propagation delay of about 400 picoseconds from an (N−M)th falling edge of the second clock signal in the particular CE interval and its falling edge is triggered preferably by the same logic circuit from an (N−M)th rising edge of the second clock signal in a CE interval immediately following the particular CE interval.

In similar fashion, the CHOP_CORE3 signal is generated such that its falling edge is triggered by a logic circuit with a propagation delay of about 1200 picoseconds from an (N−(M−1))th rising edge of the second clock signal in the particular CE interval and its rising edge is triggered preferably by the same logic circuit from an (N−(M−1))th falling edge of the second clock signal in the particular CE interval. The CHOP_CORE4 signal is generated such that its falling edge is triggered by a logic circuit with a propagation delay of 800 picoseconds from an (N−1)th falling edge of the second clock signal in the particular CE interval and its rising edge is triggered preferably by the same logic circuit from an Nth rising edge of the second clock signal in the particular CE interval.

In one presently preferred exemplary embodiment of the present invention, the logic circuit for generating the MOD_CORE signal is preferably comprised of an OR gate for ORing the CHOP_CORE1 and second clock signals and an AND gate operable to accept the CHOP_CORE2, CHOP_CORE3 and CHOP_CORE4 signals for ANDing with the OR gate's output.

In the exemplary embodiment where the first and second clock signals are provided at [1:1] ratio (i.e., same frequency), the intermediary clock signals are not provided with the rising and/or falling edges as set forth above. Instead, they are set to the following conditions: CHOP_CORE1= 0; and CHOP_CORE2 =CHOP_CORE3=CHOP_CORE4=1.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
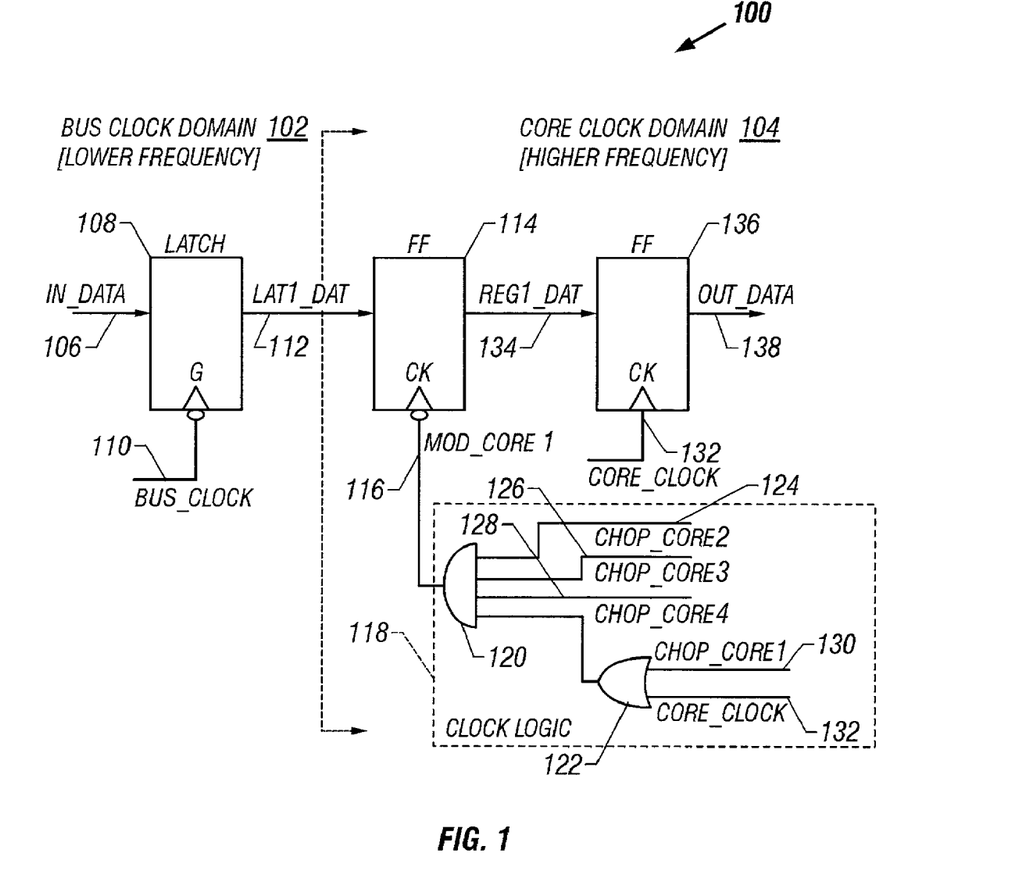
FIG. 1 depicts a logic block diagram of a presently preferred exemplary embodiment of a system for synchronizing data transfer operations from circuitry disposed in a lower frequency clock domain to circuitry disposed in a higher frequency clock domain in accordance with the teachings of the present invention.

In the drawings, like or similar elements are designated with identical reference numerals throughout the several views thereof, and the various elements depicted are not necessarily drawn to scale. Referring now to FIG. 1, depicted therein is a logic block diagram of a presently preferred exemplary embodiment of a system 100 for synchronizing data transfer operations from circuitry disposed in a lower frequency clock domain (i.e., first clock domain) to circuitry disposed in a higher frequency clock domain (i.e., second clock domain) in accordance with the teachings of the present invention. Reference numeral 102 refers to an exemplary lower frequency clock domain such as a bus clock domain in a computer system. Further, a first clock signal operating at a lower frequency is provided for actuating the lower frequency clock domain 102. Preferably, a bus clock signal (BUS_CLOCK) 110 is exemplary with respect to such a lower frequency clock signal.

In similar fashion, reference numeral 104 refers to an exemplary higher frequency clock domain such as a core clock domain in a computer system. A second clock signal operating at a higher frequency is provided for actuating the higher frequency clock domain 104. Preferably, a core clock signal (CORE_CLOCK) 132 exemplifies the higher frequency clock signal in the particular embodiment depicted in FIG. 1.

Those skilled in the art should readily appreciate that the first and second clock signals may be produced by way of any known or hitherto unknown mechanisms such as, e.g., phase-locked loops (PLLs), and the like. For purposes of the present invention, frequencies of the first and second clock signals are related to each other in a predetermined manner, preferably, e.g., in the ratio of [M:N], where N equals the number of cycles of the higher frequency clock (i.e., the second clock signal) and M equals the number of cycles of the lower frequency clock (i.e., the first clock signal) within an interval defined by two consecutive substantially coincident rising edges of the two clock signals. In the context of the present invention, this interval between two coincident rising edges of the clock signals is referred to as the CE interval. It is further preferred that M=(N−1), that is, for N cycles of the second clock signal in a particular CE interval, there are (N−1) cycles of the first clock signal.

Because the circuitry generating data in the lower frequency clock domain is actuated by the first clock signal, there are only (N−1) data pulses to be transmitted to the circuitry disposed in the higher frequency clock domain 104 operating at N cycles per CE interval. Accordingly, there is an extra clock cycle for the higher frequency clock, during which the circuitry in the higher frequency clock domain should ignore the data. It will be realized by those skilled in the art upon having reference hereto that the clock cycle for which the circuitry in the higher frequency clock domain should ignore the data is the clock cycle that occurs just before the coincident rising edge. As will be explained in greater detail hereinbelow, this extra cycle is used by the present invention's circuitry to modify the second clock signal for appropriately clocking the (N−1) data pulses in order to effectuate data transfer across the clock domain boundary even where a significant skew exists between the first and second clocks.

Continuing to refer to FIG. 1, reference numeral 106 refers to the outgoing data to be transmitted from the circuitry in clock domain 102 to the circuitry in clock domain 104. A latch 108 disposed in clock domain 102 is operable to receive the data as IN_DATA signal, which latch is gated by the first clock signal (i.e., BUS_CLOCK) 110. As is well known, the latch 108 is operable to latch IN_DATA 106 and generate an output of latched data (LAT1_DAT) 112. A first register 114 disposed in clock domain 104 is provided with LAT1_DAT 112, which register is clocked responsive to a modified second clock signal (MOD_CORE1) 116 that is described in additional detail below.

In a presently preferred exemplary embodiment of the present invention, the register 114 is embodied as a flip-flop (FF) and operates to generate an output comprising registered data (REG1_DAT) 134 on the falling edge of the MOD_CORE1 signal. Thereafter, the registered data is again registered by a second register 136 on the rising edge of the CORE_CLOCK signal 132 in order to generate a data output (OUT_DATA) 138 that is synchronized to the higher frequency core clock signal. Preferably, the second register 136 is also embodied as a flip-flop. Subsequently, the OUT_DATA signal 138 may be provided to the circuitry disposed in the higher frequency clock domain 104 for further use.

A clock logic circuit 118 disposed in clock domain 104 is operable to synthesize the MOD_CORE1 signal 116 based on the second clock signal 132 and a plurality of intermediary clock signals which are generated in a particular relationship with respect to the second clock signal 132. In the presently preferred exemplary embodiment of the present invention, four intermediary clock signals, CHOP_CORE1, CHOP_CORE2, CHOP_CORE3 and CHOP_CORE4 128, are used in addition to the CORE_CLOCK signal 132 for generating the MOD_CORE1 signal 116. The exemplary logic circuit 118 comprises an OR gate 122 for ORing the CHOP_CORE1 signal 130 and the second clock signal, i.e., CORE_CLOCK 132. An AND gate 120 is provided for ANDing the output provided by the OR gate 122 with the remaining CHOP_CORE signals, i.e., CHOP_CORE2 124, CHOP_CORE3 126 and CHOP_CORE4 128.

Figure 2:
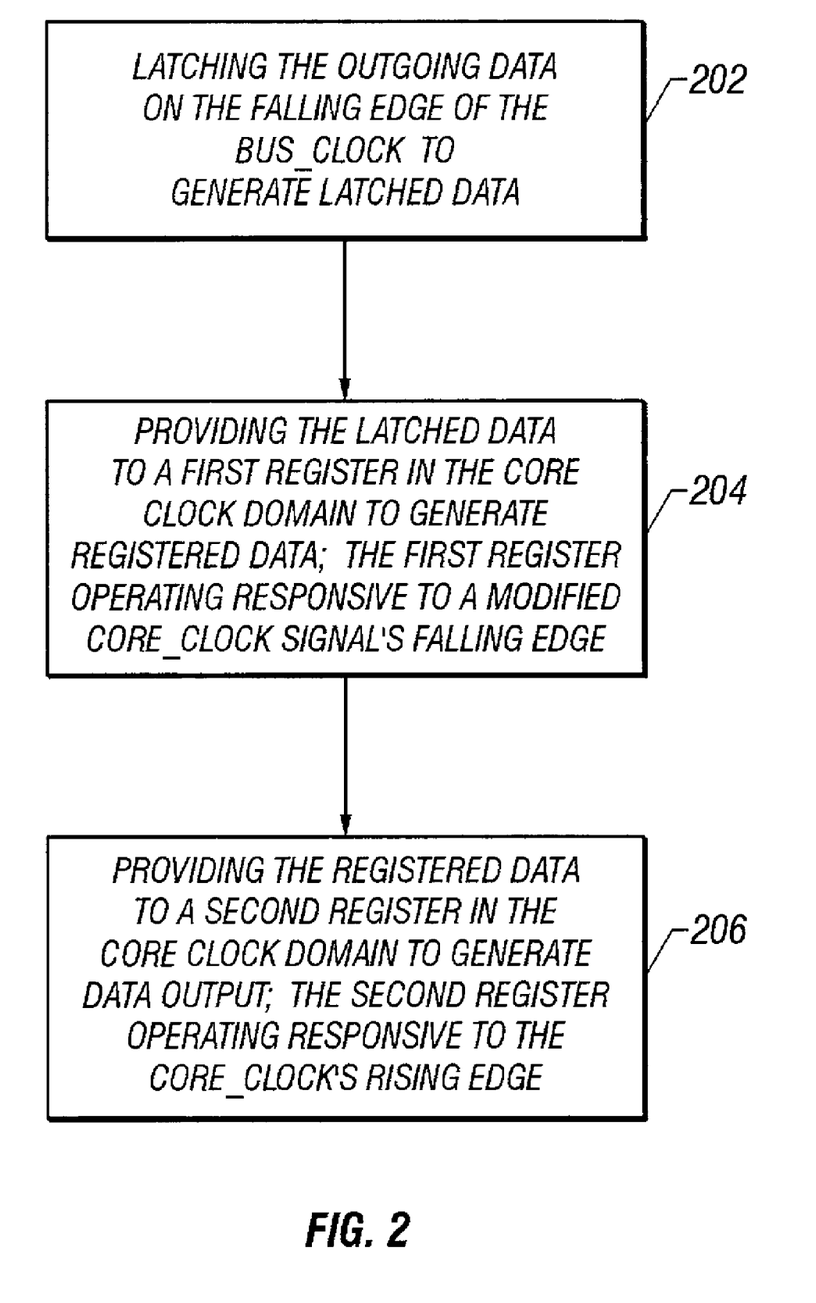
FIG. 2 depicts a flow chart of the various steps involved in a presently preferred exemplary method of transferring data across a clock domain boundary.

FIG. 2 depicts a flow chart of the various steps involved in a presently preferred exemplary method of transferring data across a clock domain boundary from the lower frequency clock domain 102 to the higher frequency clock domain 104 in accordance with the teachings of the present invention. The outgoing data provided by the circuitry disposed in the lower frequency clock domain 102 is first latched on the falling edge of the first clock signal to generate latched data (step 202). The latched data is thereafter provided to a first register disposed in the higher frequency clock domain 104 which registers the latched data on the falling edge of the modified second clock signal in order to generate a registered data output (step 204). The registered data is provided to a second register in the higher frequency clock domain 104 which registers it again on the rising edge of the second clock signal (step 206) to produce a synchronized data output.

In accordance with the teachings of the present invention, the intermediary clock signals used by the logic circuit 118 for generating the modified second clock signal may be generated using any combinational or sequential logic so long as certain time constraints are met as set forth in the following. In the presently preferred exemplary embodiment of the present invention, the CHOP_CORE1 signal is generated such that its rising edge is triggered with a propagation delay of about 400 picoseconds from an (N−1)th rising edge of the second clock signal in a particular CE interval and its falling edge is triggered with a propagation delay of about 400 picoseconds from an (N−M)th rising edge of the second clock signal in a CE interval immediately following the particular CE interval. It should be apparent to those skilled in the art that because M=(N−1), the (N−M)th rising edge in fact coincides with the first rising edge of the next CE interval, which is also the boundary between the CE intervals. The CHOP_CORE2 clock signal is generated such that its rising edge is triggered with a propagation delay of about 400 picoseconds from an (N−M)th falling edge of the second clock signal in the particular CE interval and its falling edge is triggered with a propagation delay of about 400 picoseconds from an (N−M)th rising edge of the second clock signal in a CE interval immediately following the particular CE interval, i.e., the first rising edge of the next CE interval.

In similar fashion, the CHOP_CORE3 signal is generated such that its falling edge is triggered with a propagation delay of about 1200 picoseconds from an (N−(M−1))th rising edge of the second clock signal in the particular CE interval and its rising edge is triggered with a propagation delay of about 1200 picoseconds from an (N−(M−1))th falling edge of the second clock signal in the particular CE interval. The CHOP_CORE4 signal is generated such that its falling edge is triggered with a propagation delay of about 800 picoseconds from an (N−1)th falling edge of the second clock signal in the particular CE interval and its rising edge is triggered with a propagation delay of about 800 picoseconds from an Nth rising edge of the second clock signal in the particular CE interval.

It should be recognized that the logic circuits for generating the various CHOP_CORE signals can be implemented in any fashion as long as the timing constraints set forth above are substantially met. Further, where the logic circuits are comprised of one or more logic gates, the timing constraints may also be formulated in terms of gate propagation delays. Exemplary implementations can include, for instance, a propagation delay of about 200 picoseconds per gate, 400 picoseconds per gate, etc.

Figure 3:
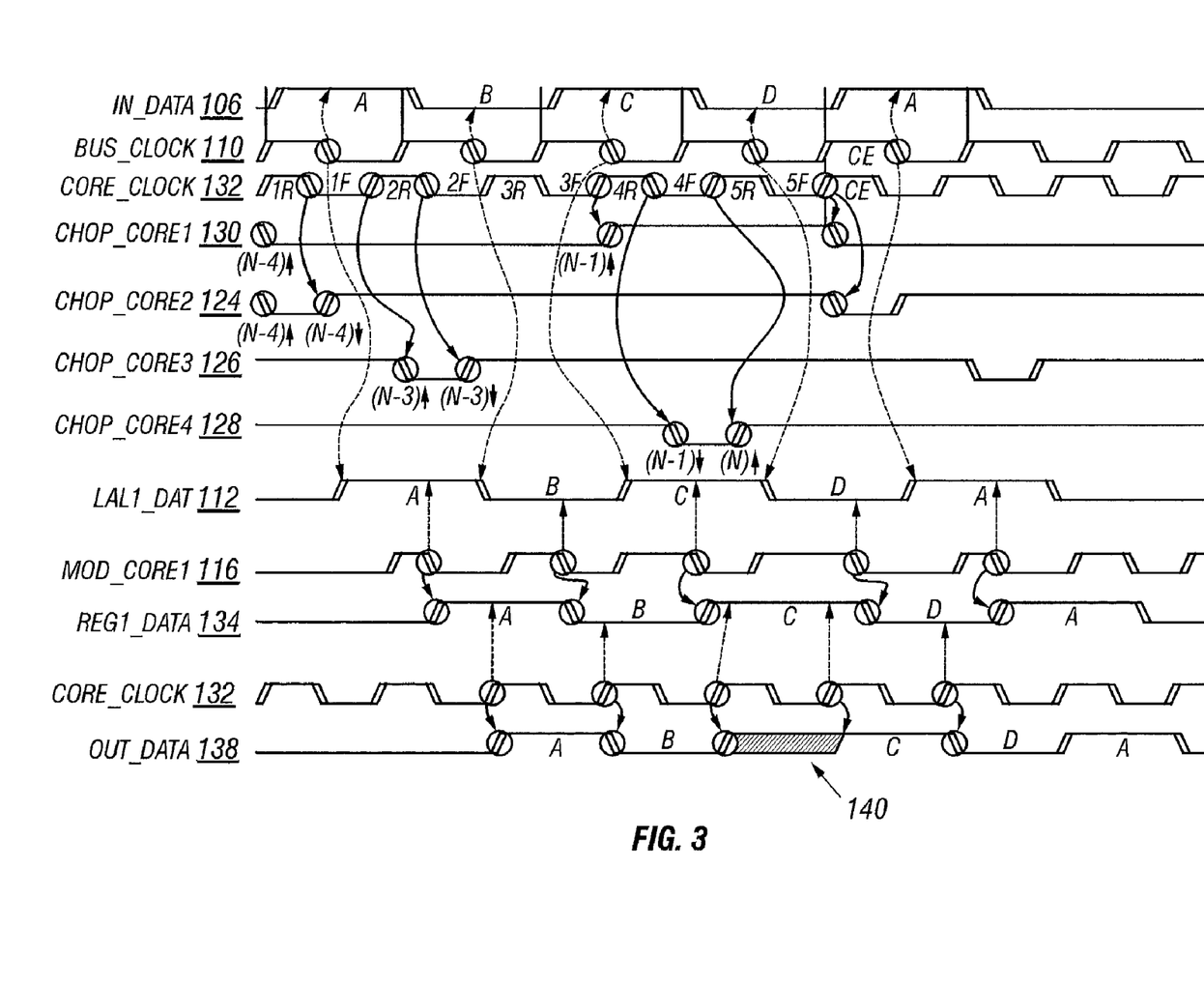
FIG. 3 depicts a timing diagram of the various signals used for effectuating the high skew-tolerant data transfer method of the present invention for an exemplary [4:5] clock frequency ratio.

Referring now to FIG. 3, depicted therein is a timing diagram of the various signals used for effectuating the high skew-tolerant data transfer method of the present invention for an exemplary [4:5] clock frequency ratio where for every 4 BUS_CLOCK cycles, there exist 5 CORE_CLOCK cycles within a CE interval. The data to be transferred to the CORE_CLOCK domain is represented by IN_DATA 106 where A, B, C and D denote logic states for 4 data bits in a particular CE interval. The latched data (LAT1_DATA) 112 is generated on the falling edge of the BUS_CLOCK signal 110. The rising edge of the CHOP_CORE1 signal 130 is triggered by the fourth rising edge (t) of the CORE_CLOCK signal 132 with a delay of about 400 picoseconds. Its falling edge is triggered with a delay of about 400 picoseconds from the first rising edge (↑) of the CORE_CLOCK signal 132 in the next CE interval. The CHOP_CORE2 signal 124 is generated with a rising edge that is triggered with a delay of about 400 picoseconds by the first falling edge (↓) of the CORE_CLOCK 132 in the select CE interval. Subsequently, the CHOP_CORE2 signal is held high until its falling edge is generated based on the first rising edge (↑) of the CORE_CLOCK in the following CE interval, with a delay of about 400 picoseconds.

The CHOP_CORE3 signal 126 starts out in a logic HIGH condition and its falling edge is triggered based on the second rising edge (T) of the CORE_CLOCK 132. Preferably, a propagation-delay of about 1200 picoseconds is provided for creating the falling edge in the CORE_CLOCK3 signal 126. Thereafter, it is brought back up to the logic HIGH condition by creating a rising edge based on the second falling edge (↓) of the CORE_CLOCK 132. Again, a propagation delay of about 1200 picoseconds is provided.

The CHOP_CORE4 signal 128 also starts out in a logic HIGH condition. It is driven LOW by creating a falling edge based on the fourth falling edge (↓) of the CORE_CLOCK 132. Thereafter, it is driven HIGH by creating a rising edge that is triggered with respect to the fifth rising edge (↑) of the CORE_CLOCK 132. A propagation delay of about 800 picoseconds is provided in the formation of the rising and falling edges of the CHOP_CORE4 signal.

The exemplary logic circuit 118 (shown in FIG. 1) is operable to synthesize the MOD_CORE1 signal 116 based on the combination of the intermediary clock signals and the CORE_CLOCK as described hereinabove. It can be seen in the timing diagram that the pulse width of the MOD_CORE1 signal is modulated to a variable degree such that the falling edges therein, which clock the data into the first register, are timed to register the LAT1_DAT 112 at appropriate times to generate the REG1_DATA 134. The rising edges of the CORE_CLOCK 132 actuate the second register disposed in the higher frequency clock domain, which register is then operable to register the REG1_DATA 134 again to generate the OUT_DATA 138. Reference numeral 140 refers to the hatched portion of data in OUT_DATA 138 that the following circuitry will ignore since it corresponds to the "data" latched by the clock just before the coincident rising edge.

Figure 4:
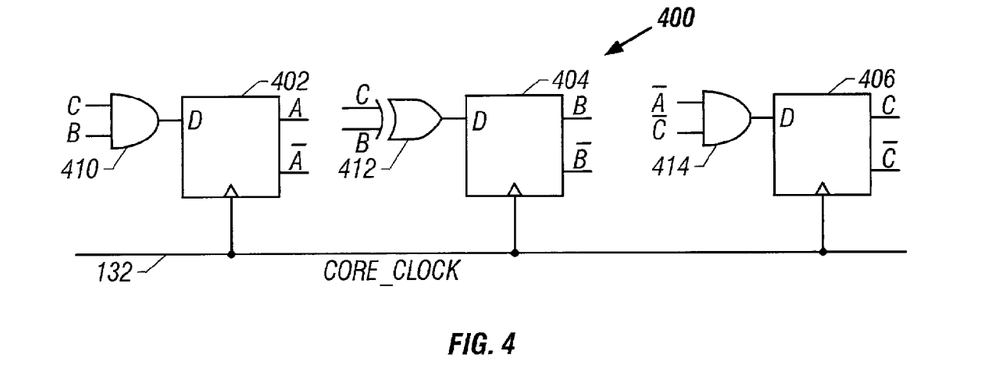
FIG. 4 depicts an exemplary counter circuit for counting the rising edges of a core clock signal employed in the [4:5] clock frequency scenario.

FIG. 4 depicts an exemplary counter circuit 400 for counting the rising edges of the CORE_CLOCK signal 132 employed in the [4:5] clock frequency scenario illustrated hereinabove. Three D flip-flops 402, 404 and 406 are clocked by the rising edges of CORE_CLOCK 132, wherein the D input of each flip-flop is operable to receive an output synthesized by a combination of signals that are generated by one or more of the remaining flip-flops. In the exemplary counter circuit 400, an AND gate 410 receives signals B and C, whose output is provided to the D input of D flip-flop 402. As shown in FIG. 4, signals B and C are generated by the flip-flops 404 and 406. An exclusive-OR (XOR) gate 412 also receives B and C signals, whose output is provided to the D input of the flip-flop 404. An AND gate 414 receives A bar and C bar signals, whose logic output is provided to the D input of the flip-flop 406.

Figure 5:
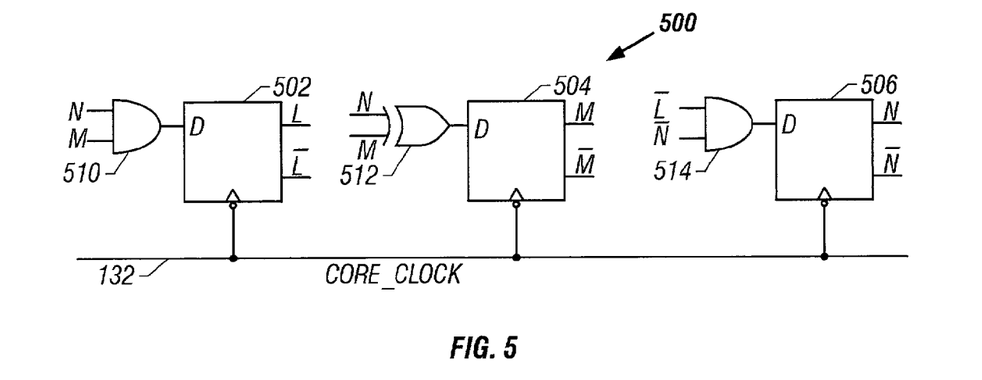
FIG. 5 depicts an exemplary counter circuit for counting the falling edges of the core clock signal employed in the [4:5] clock frequency scenario.

FIG. 5 depicts an exemplary counter circuit 500 for counting the falling edges of the CORE_CLOCK signal 132 employed in the [4:5] clock frequency scenario. It should be appreciated that the counter circuit 500 is essentially identical to the counter circuit 400 described above, except that the three D flip-flops 502, 504 and 506 are clocked by the falling edges of CORE_CLOCK 132. Reference numerals 510, 512 and 514 refer to the AND, XOR and AND gates that provide inputs to the three flip-flops, respectively, in a manner similar to the operation of the counter circuit 400.

Figure 6:
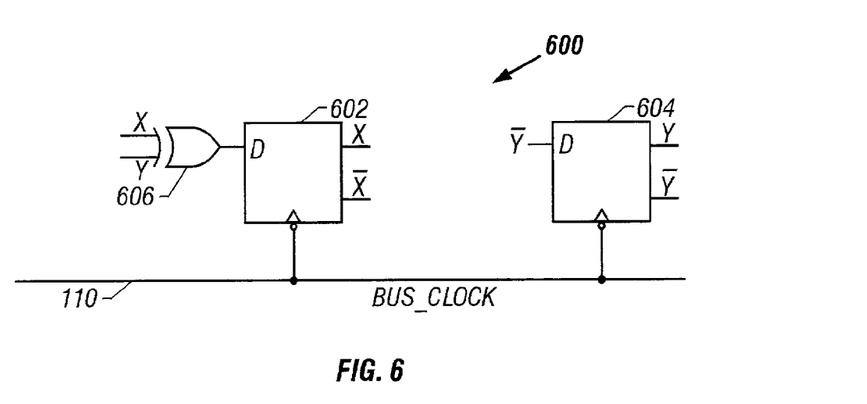
FIG. 6 depicts an exemplary counter circuit for counting the falling edges of a bus clock signal employed in the [4:5] clock frequency scenario.

FIG. 6 depicts an exemplary counter circuit 600 for counting the falling edges of the BUS_CLOCK signal 110 employed in the [4:5] clock frequency scenario. Two D flip-flops 602 and 604 are clocked by the falling edges of BUS_CLOCK 110. In the exemplary embodiment of the counter circuit 600, the outputs of the flip-flops are fed back as at least part of the inputs to the flip-flops. Whereas the output of an XOR gate 606 is provided to the D input of the flip-flop 602, no logic gates are employed with respect to the D input of the flip-flop 604.

Figure 7A:
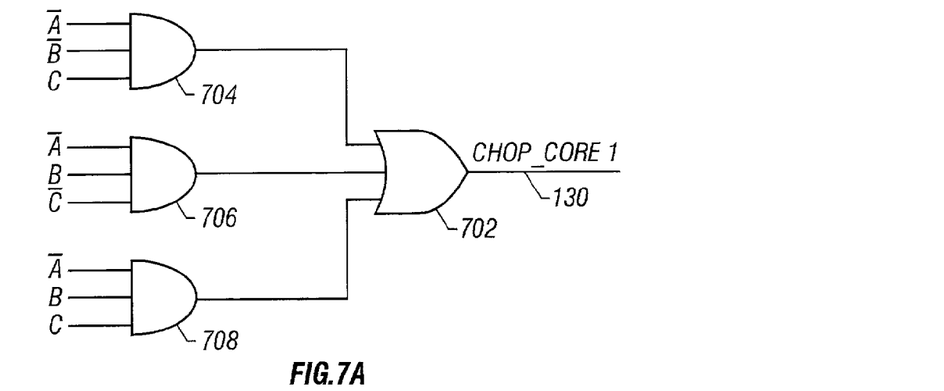
FIGS. 7A–7D depict exemplary logic circuits for generating a plurality of intermediary clock signals based on the core clock signal.
Figure 7B:
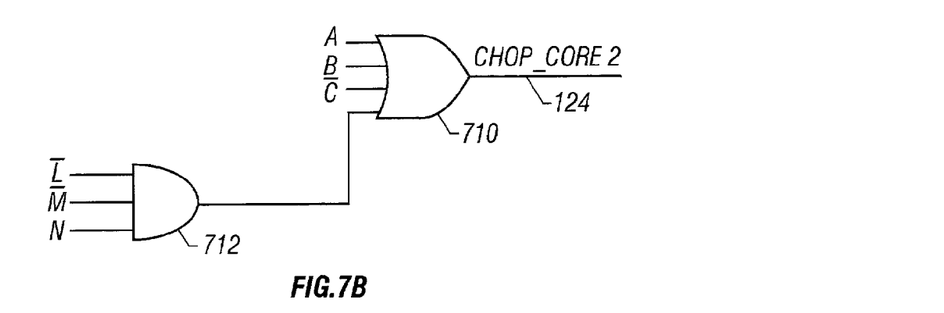
Figure 7C:
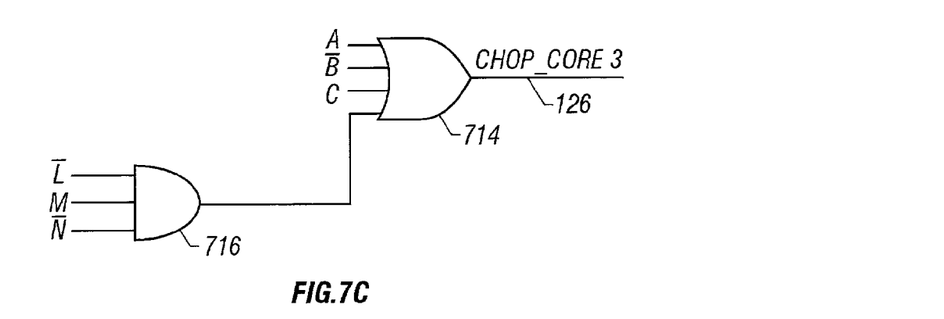
Figure 7D:
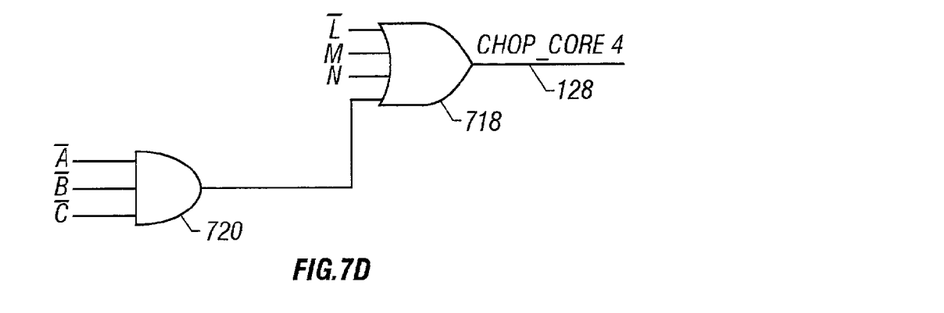

FIGS. 7A–7D depict four exemplary logic circuits for generating the intermediary CHOP_CORE signals described above. Each of the logic circuits is preferably operable to receive a combination of one or more signals generated by the counter circuits set forth in the foregoing Detailed Description with respect to FIGS. 4–6, either individually or through a combination of at least one logic gate. As shown in FIG. 7A, an OR gate 702 receiving inputs from three AND gates 704, 706 and 708 is operable to generate the CHOP_CORE1 signal 130. Referring to FIG. 7B, an OR gate 710 receiving inputs from an AND gate 712 and signals A, B and C bar is operable to generate CHOP_CORE2 124. In similar fashion, CHOP_CORE3 126 is generated by a combination of an OR gate 714 and an AND gate 716, in addition to signals A, B bar and C. As shown in FIG. 7D, CHOP_CORE4 128 is generated by a combination of an OR gate 718 receiving inputs from an AND gate 720 and signals A bar, B bar and C bar.

Based upon the foregoing Detailed Description, it should be readily apparent that the present invention provides a simple yet highly effective data transfer synchronizer system and method that allows two interfaces operating at different clock frequencies to send information from the lower frequency domain circuitry to the higher frequency domain circuitry at high speeds with low latency, even where the skew between the clocks is substantial. Because the combinational logic necessary for creating the modified clock signal or the intermediary clock signals is relatively simple and avoids the use of more complicated circuitry, e.g., cross-coupled gates to generate modified core or modified bus clock signals, et cetera, which gives rise to unstable behavior, a robust data transfer synchronizer solution is advantageously realized.

Further, it is believed that the operation and construction of the present invention will be apparent from the foregoing Detailed Description. While the system and method shown and described have been characterized as being preferred, it should be readily understood that various changes and modifications could be made therein (e.g., in the implementation of the logic circuitry and generation of the modified or intermediary clock signals) without departing from the scope of the present invention as set forth in the following claims.

What is claimed is:

1. A method of transferring data from circuitry disposed in a lower frequency clock domain to circuitry disposed in a higher frequency clock domain, said lower frequency clock domain operating with a first clock signal and said higher frequency clock domain operating with a second clock signal, comprising:
   latching said data in a latch gated by said first clock signal to generate latched data;
   providing said latched data to a first register in said higher frequency clock domain to generate registered data, said first register operating responsive to a modified clock signal synthesized based on a plurality of intermediary clock signals that are generated at least in part from said second clock signal; and
   providing said registered data to a second register in said higher frequency clock domain to generate a synchronized data output, said second register operating responsive to said second clock signal.

2. The method of transferring data as set forth in claim 1, wherein said first and second clock signals are provided at a ratio of [M:N], where N equals the number of cycles of said second clock signal and M equals the number of cycles of said first clock signal and further equals (N−1), said cycles of said first and second clock signals being disposed between two substantially coincident rising edges of said first and second clocks signals that demarcate a coincident edge (CE) interval.

3. The method of transferring data as set forth in claim 2, wherein said intermediary clock signals comprise CHOP_CORE1, CHOP_CORE2, CHOP_CORE3 and CHOP_CORE4 signals, each of which signals is derived in a particular relationship with respect to said second clock signal.

4. The method of transferring data as set forth in claim 3, wherein said CHOP_CORE1 signal is generated such that its rising edge is triggered based on an (N−1)th rising edge of said second clock signal in a particular CE interval and its falling edge is triggered based on an (N−M)th rising edge of said second clock signal in a CE interval immediately following said particular CE interval.

5. The method of transferring data as set forth in claim 4, wherein said CHOP_CORE2 signal is generated such that its rising edge is triggered based on an (N−M)th falling edge of said second clock signal in said particular CE interval and its falling edge is triggered based on an (N−M)th rising edge of said second clock signal in a CE interval immediately following said particular CE interval.

6. The method of transferring data as set forth in claim 5, wherein said CHOP_CORE3 signal is generated such that its falling edge is triggered based on an (N−(M−1))th rising edge of said second clock signal in said particular CE interval and its rising edge is triggered based on an (N−(M−1))th falling edge of said second clock signal in said particular CE interval.

7. The method of transferring data as set forth in claim 6, wherein said CHOP_CORE4 signal is generated such that its falling edge is triggered based on an (N−1)th falling edge of said second clock signal in said particular CE interval and its rising edge is triggered based on an Nth rising edge of said second clock signal in said particular CE interval.

8. The method of transferring data as set forth in claim 7, wherein said rising edge of said CHOP_CORE1 signal is delayed by a propagation delay of approximately about 400 picoseconds from said (N−1)th rising edge of said second clock signal in said particular CE interval.

9. The method of transferring data as set forth in claim 8, wherein said falling edge of said CHOP_CORE1 signal is delayed by a propagation delay of approximately about 400 picoseconds from said (N−M)th rising edge of said second clock signal in said CE interval immediately following said particular CE interval.

10. The method of transferring data as set forth in claim 7, wherein said rising edge of said CHOP_CORE2 signal is delayed by a propagation delay of approximately about 400 picoseconds from said (N−M)th falling edge of said second clock signal in said particular CE interval.

11. The method of transferring data as set forth in claim 10, wherein said falling edge of said CHOP_CORE2 signal is delayed by a propagation delay of approximately about 400 picoseconds from said (N−M)th rising edge of said second clock signal in said CE interval immediately following said particular CE interval.

12. The method of transferring data as set forth in claim 7, wherein said falling edge of said CHOP_CORE3 signal is delayed by a propagation delay of approximately about 1200 picoseconds from said (N−(M−1))th rising edge of said second clock signal in said particular CE interval.

13. The method of transferring data as set forth in claim 12, wherein said rising edge of said CHOP_CORE3 signal is delayed by a propagation delay of approximately about 1200 picoseconds from said (N−(M−1)) th falling edge of said second clock signal in said particular CE interval.

14. The method of transferring data as set forth in claim 7, wherein said falling edge of said CHOP_CORE4 signal is delayed by a propagation delay of approximately about 800 picoseconds from said (N−1)th falling edge of said second clock signal in said particular CE interval.

15. The method of transferring data as set forth in claim 14, wherein said rising edge of said CHOP_CORE4 signal is delayed by a propagation delay of approximately about 800 picoseconds from said Nth rising edge of said second clock signal in said particular CE interval.

16. The method of transferring data as set forth in claim 7, wherein said logic circuit is comprised of an OR gate for ORing said CHOP_CORE1 and second clock signals and an AND gate operable to accept said CHOP_CORE2, CHOP_CORE3 and CHOP_CORE4 signals for ANDing with an output generated by said OR gate.

17. A method of transferring data across a clock domain boundary, comprising:
   latching data provided by circuitry disposed in a first frequency domain to generate latched data, said latching being gated in conjunction with a first clock signal actuating said first frequency domain;
   providing said latched data to a first register clocked by a modified clock signal that is synthesized based on a second clock signal and four intermediary clock signals derived from said second clock signal, said first register operating to output registered data;
   providing said registered data to a second register clocked by said second clock signal, said second register operating to generate a data output synchronized to said second clock signal; and
   providing said data output to circuitry disposed in a second frequency domain actuated by said second clock signal;
   wherein said first clock signal operates at a lower frequency and said second clock signal operates at a higher frequency, said lower and higher frequencies being related in a ratio of [M:N], where N equals the number of cycles of said second clock signal and M equals the number of cycles of said first clock signal and further equals (N−1), said cycles of said first and second clock signals being disposed between two substantially coincident rising edges of said first and second clocks signals that demarcate a coincident edge (CE) interval.

18. The method of transferring data across a clock domain boundary as set forth in claim 17, wherein first frequency domain is a bus clock domain in a computer system.

19. The method of transferring data across a clock domain boundary as set forth in claim 18, wherein second frequency domain is a core clock domain in a computer system.

20. The method of transferring data across a clock domain boundary as set forth in claim 17, wherein a first intermediary clock signal is generated such that its rising edge is triggered with a propagation delay of about 400 picoseconds from an (N−1)th rising edge of said second clock signal in a particular CE interval and its falling edge is triggered with a propagation delay of 400 picoseconds from an (N−M)th rising edge of said second clock signal in a CE interval immediately following said particular CE interval.

21. The method of transferring data across a clock domain boundary as set forth in claim 17, wherein a second intermediary clock signal is generated such that its rising edge is triggered with a propagation delay of about 400 picoseconds from an (N−M) th falling edge of said second clock signal in a particular CE interval and its falling edge is triggered with a propagation delay of about 400 picoseconds from an (N−M)th rising edge of said second clock signal in a CE interval immediately following said particular CE interval.

22. The method of transferring data across a clock domain boundary as set forth in claim 17, wherein a third intermediary clock signal is generated such that its falling edge is triggered with a propagation delay of about 1200 picoseconds from an (N−(M−1))th rising edge of said second clock signal in a particular CE interval and its rising edge is triggered with a propagation delay of about 1200 picoseconds from an (N−(M−1))th falling edge of said second clock signal in said particular CE interval.

23. The method of transferring data across a clock domain boundary as set forth in claim 17, wherein a fourth intermediary clock signal is generated such that its falling edge is triggered with a propagation delay of about 800 picoseconds from a (N−1)th falling edge of said second clock signal in a particular CE interval and its rising edge is triggered with a propagation delay of about 800 picoseconds from an Nth rising edge of said second clock signal in said particular CE interval.

24. A system for transferring data from circuitry disposed in a first clock domain to circuitry disposed in a second clock domain, said first clock domain operating with a first clock signal and said second clock domain operating with a second clock signal, comprising:
  a latch gated by said first clock signal operable to generate latched data based on data from said circuitry disposed in said first clock domain;
  a first register disposed in said second clock domain operable to generate registered data upon receiving said latched data from said latch, said first register operating responsive to a modified clock signal synthesized at least in part from said second clock signal;
  a logic circuit operable to generate said modified clock signal based on said second clock signal and a plurality of intermediary clock signals derived from said second clock signal; and
  a second register in said second clock domain to generate a synchronized data output upon receiving said registered data, said second register operating responsive to said second clock signal to provide said synchronized data output to said circuitry disposed in said second clock domain.

25. The system for transferring data as set forth in claim 24, wherein said first and second clock signals are provided at a ratio of [M:N], where N equals the number of cycles of said second clock signal and M equals the number of cycles of said first clock signal and further equals (N−1), said cycles of said first and second clock signals being disposed between two substantially coincident rising edges of said first and second clocks signals that demarcate a coincident edge (CE) interval.

26. The system for transferring data as set forth in claim 25, wherein said intermediary clock signals comprise CHOP_CORE1, CHOP_CORE2, CHOP_CORE3 and CHOP_CORE4 signals, each of which signals is derived in a particular relationship with respect to said second clock signal.

27. The system for transferring data as set forth in claim 26, wherein said logic circuit is comprised of an OR gate for ORing said CHOP_CORE1 and second clock signals and an AND gate operable to accept said CHOP_CORE2, CHOP_CORE3 and CHOP_CORE4 signals for ANDing with an output generated by said OR gate.

28. The system for transferring data as set forth in claim 26, wherein said CHOP_CORE1 signal is generated such that its rising edge is triggered with a propagation delay of about 400 picoseconds from an (N−1)th rising edge of said second clock signal in a particular CE interval and its falling edge is triggered with a propagation delay of about 400 picoseconds from an (N−M)th rising edge of said second clock signal in a CE interval immediately following said particular CE interval.

29. The system for transferring data as set forth in claim 26, wherein said CHOP_CORE2 clock signal is generated such that its rising edge is triggered with a propagation delay of about 400 picoseconds from an (N−M)th falling edge of said second clock signal in a particular CE interval and its falling edge is triggered with a propagation delay of about 400 picoseconds from an (N−M)th rising edge of said second clock signal in a CE interval immediately following said particular CE interval.

30. The system for transferring data as set forth in claim 26, wherein said CHOP_CORE3 signal is generated such that its falling edge is triggered with a propagation delay of about 1200 picoseconds from an (N−(M−1))th rising edge of said second clock signal in a particular CE interval and its rising edge is triggered with a propagation delay of about 1200 picoseconds from an (N−(M−1))th falling edge of said second clock signal in said particular CE interval.

31. The system for transferring data as set forth in claim 26, wherein said CHOP_CORE4 signal is generated such that its falling edge is triggered with a propagation delay of about 800 picoseconds from an (N−1)th falling edge of said second clock signal in a particular CE interval and its rising edge is triggered with a propagation delay of about 800 picoseconds from an Nth rising edge of said second clock signal in said particular CE interval.

32. The system for transferring data as set forth in claim 24, wherein said first and second clocks are provided at a ratio of [1:1], and further wherein said intermediary clock signals comprise CHOP_CORE1, CHOP_CORE2, CHOP_CORE3 and CHOP_CORE4 signals such that CHOP_CORE1=0 and CHOP_CORE2=CHOP_CORE3=CHOP_CORE4=1.

* * * * *

UNITED STATES PATENT AND TRADEMARK OFFICE
CERTIFICATE OF CORRECTION

PATENT NO. : 6,928,574 B1
APPLICATION NO. : 09/938210
DATED : August 9, 2005
INVENTOR(S) : Rajakrishnan Radjassamy Page 1 of 1

It is certified that error appears in the above-identified patent and that said Letters Patent is hereby corrected as shown below:

In column 1, line 50, delete "$F_C/F_D>1$." and insert -- $F_C/F_D\geq 1$. --, therefor.

In column 5, line 21, delete "CHOP_CORE1, CHOP_CORE2, CHOP_CORE3" and insert -- CHOP_CORE1 130, CHOP_CORE2 124, CHOP_CORE3 126 --, therefor.

In column 6, line 41, delete "(t)" and insert -- (↑) --, therefor.

In column 6, line 55, delete "(T)" and insert -- (↑) --, therefor.

In column 10, line 26, in Claim 17, delete "signal;" and insert -- signal, --, therefor.

Signed and Sealed this

Eleventh Day of August, 2009

David J. Kappos
*Director of the United States Patent and Trademark Office*